(12) United States Patent
Lear et al.

(10) Patent No.: US 8,559,426 B2
(45) Date of Patent: Oct. 15, 2013

(54) SYSTEM AND METHOD FOR DISTRIBUTION OF DATA PACKETS UTILIZING AN INTELLIGENT DISTRIBUTION NETWORK

(76) Inventors: Ben A. Lear, Mudgee (AU); Joseph F. Hayes, Frenchs Forest (AU)

( * ) Notice: Subject to any disclaimer, the term of this patent is extended or adjusted under 35 U.S.C. 154(b) by 1758 days.

(21) Appl. No.: 09/936,624

(22) PCT Filed: Jan. 11, 2001

(86) PCT No.: PCT/AU01/00015
§ 371 (c)(1),
(2), (4) Date: Feb. 5, 2002

(87) PCT Pub. No.: WO01/52483
PCT Pub. Date: Jul. 19, 2001

(65) Prior Publication Data
US 2003/0099202 A1    May 29, 2003

(30) Foreign Application Priority Data

Jan. 11, 1920 (AU) ........................................ PQ5041

(51) Int. Cl.
*H04L 12/56* (2011.01)
(52) U.S. Cl.
USPC ........... 370/390; 370/230; 370/255; 370/396; 370/428
(58) Field of Classification Search
USPC ......... 370/254, 255, 351, 352, 389, 390, 396, 370/398, 395.31, 400, 406, 408, 422, 428; 709/220, 221, 231–235, 238–242, 203, 709/223–229
See application file for complete search history.

(56) References Cited

U.S. PATENT DOCUMENTS

| | | | |
|---|---|---|---|
| 5,291,477 A | * | 3/1994 | Liew .............................. 370/238 |
| 5,808,607 A | * | 9/1998 | Brady et al. ................... 715/756 |

(Continued)

FOREIGN PATENT DOCUMENTS

| | | |
|---|---|---|
| EP | 0753952 A2 | 1/1997 |
| EP | 0939560 A1 | 9/1999 |
| EP | 0578041 B1 | 11/1999 |
| WO | WO 98/29998 A2 | 7/1998 |

OTHER PUBLICATIONS

McCanne, Scalable Multimedia Communication, IEEE Internet Computing, Mar.-Apr. 1999, pp. 33-45.

(Continued)

*Primary Examiner* — Hassan Phillips
*Assistant Examiner* — Mark A Mais
(74) *Attorney, Agent, or Firm* — Ostrow Kaufman LLP (57) ABSTRACT

A system and method for efficient distribution of streamed media content to large and diversely located client locations is provided whereby an intelligent distribution network (IDN) center manages the delivery of the streamed media to a plurality of clients. The IDN center determines the most efficient delivery route to each client by utilizing trace routes between the IDN center, IDN nodes, various transmission devices and the client. Once a 'best performing' IDN node and network link is determined, the IDN center directs the client to the 'best' node and instructs deliver of a content stream along the 'best' link. Upon receiving the streamed media, the 'best' node replicates the stream and delivers the media to the client. Additional clients may 'piggyback' off the initial content stream by obtaining a replication of the media from their 'best' nodes which are, or connected to nodes, already transmitting/receiving the initial content stream.

17 Claims, 8 Drawing Sheets

(56) References Cited

U.S. PATENT DOCUMENTS

| | | | |
|---|---|---|---|
| 5,854,899 A | 12/1998 | Callon et al. | |
| 5,948,055 A | 9/1999 | Pulsipher et al. | |
| 6,044,075 A * | 3/2000 | Le Boudec et al. | 370/351 |
| 6,069,895 A * | 5/2000 | Ayandeh | 370/399 |
| 6,175,870 B1 * | 1/2001 | Gawlick et al. | 709/227 |
| 6,310,883 B1 * | 10/2001 | Mann et al. | 370/408 |
| 6,343,313 B1 * | 1/2002 | Salesky et al. | 709/204 |
| 6,411,946 B1 * | 6/2002 | Chaudhuri | 706/21 |
| 6,452,915 B1 * | 9/2002 | Jorgensen | 370/338 |
| 6,484,143 B1 * | 11/2002 | Swildens et al. | 705/1 |
| 6,487,604 B1 * | 11/2002 | Rochford et al. | 709/238 |
| 6,502,125 B1 * | 12/2002 | Kenner et al. | 709/203 |
| 6,553,568 B1 * | 4/2003 | Fijolek et al. | 725/111 |
| 6,640,239 B1 * | 10/2003 | Gidwani | 709/203 |
| 6,665,706 B2 * | 12/2003 | Kenner et al. | 709/203 |
| 6,691,312 B1 * | 2/2004 | Sen et al. | 725/96 |
| 6,718,359 B2 * | 4/2004 | Zisapel et al. | 718/105 |
| 6,760,775 B1 * | 7/2004 | Anerousis et al. | 709/238 |
| 6,826,182 B1 * | 11/2004 | Parthasarathy | 370/390 |
| 6,972,786 B1 * | 12/2005 | Ludwig | 348/14.11 |
| 7,010,578 B1 * | 3/2006 | Lewin et al. | 709/217 |
| 7,028,083 B2 * | 4/2006 | Levine et al. | 709/223 |
| 7,085,843 B2 * | 8/2006 | Buddhikot et al. | 709/231 |
| 7,089,577 B1 * | 8/2006 | Rakib et al. | 725/87 |
| 7,111,061 B2 * | 9/2006 | Leighton et al. | 709/224 |
| 7,124,195 B2 * | 10/2006 | Roach et al. | 709/232 |
| 7,155,215 B1 * | 12/2006 | Miernik et al. | 455/423 |
| 7,181,206 B2 * | 2/2007 | Pedersen | 455/425 |
| 7,251,688 B2 * | 7/2007 | Leighton et al. | 709/224 |
| 7,293,093 B2 * | 11/2007 | Leighton et al. | 709/226 |
| 7,370,016 B1 * | 5/2008 | Hunter et al. | 705/57 |
| 7,415,527 B2 * | 8/2008 | Varadarajan et al. | 709/231 |
| 7,433,688 B2 * | 10/2008 | Miernik et al. | 455/432.3 |
| 7,633,863 B2 * | 12/2009 | Kim et al. | 370/230 |
| 7,639,657 B1 * | 12/2009 | Ho et al. | 370/338 |
| 7,697,567 B2 * | 4/2010 | Ono et al. | 370/468 |

OTHER PUBLICATIONS

Levine, et. al., Improving Internet Multicast with Routing Labels, Proceedings of the 1997 International Conference on Network Protocols, ICNP'97, pp. 241-250.

* cited by examiner

SYSTEM AND METHOD FOR DISTRIBUTION OF DATA PACKETS UTILIZING AN INTELLIGENT DISTRIBUTION NETWORK

CROSS-REFERENCE TO RELATED APPLICATION

This application claims the priority and benefit of Australian Provisional Patent Application Serial No. PQ5041 entitled "A Method for Distribution of Streamed Data Packets on a Switched Network Utilizing an Intelligent Distribution Network," filed on Jan. 11, 2000, the subject matter of which is hereby incorporated by reference.

BACKGROUND

1. Technical Field

The present system and method relate generally to network data transmission, and more particularly to efficient distribution of data utilizing an intelligent distribution network.

2. Description of the Background Art

The Internet is a network of virtually connected computers and network-enabled devices currently using Transfer Control Protocol (TCP) and Internet Protocol (IP). TCP/IP is a combination of these two means to deliver data from a host to a client, which involves the breaking down of large data blocks into a plurality of small data packets for transmission by asynchronous transmission electronic devices. Each packet contains packet order information such that when it arrives at a client, the packets can be contiguously reordered even if packets do not arrive in the correct packet order due to intrinsic network behavior. Furthermore, TCP can decide based on intrinsic packet timing criteria whether a packet has been lost or unacceptably delayed, which may result in a subsequent request by the client for a retransmission of the lost or delayed packets. Thus, the greater the number of lost or unacceptably delayed packets, the greater overall decrease to network throughput and increased latency.

When a data packet is transmitted from a host to a client, it passes through various asynchronous transmission devices such as routers, switches, hubs and bridges. Typically, the data packet may incur a latency of approximately 40 ms per transmission device. Because there are numerous paths of varying number of transmission devices that a data packet may travel, a contiguous set of data packets sent from a host may incur considerable timing disruptions making it impossible for the packets to arrive at the client in a contiguous order. Additionally the total delay time for data packet transmission may exceed acceptable ergonomic requirements.

Theoretically, these transmission devices are limited by maximum capacity or bandwidth. For example, a client can presently link to an Internet Service Provider (ISP) through a Public Standard Telephone Network (PSTN) Connection with a modem at a bandwidth capacity typically of fourteen thousand, four hundred bits per second to sixty four thousand bits per second. Alternatively, Broadband Internet Service Providers (BISP) offer larger bandwidth capacity, but essentially function in a similar role of connecting the client to a router at the ISP.

All data to and from clients are combined at the ISP. This combined data can be managed more efficiently as the asynchronous transmission devices are located within the ISP Local Area Network (LAN) that has typical bandwidths of many gigabits per second. Therefore, data that is available within the LAN can be sent to clients of that ISP with maximum network throughput and minimal loss of packets or unacceptable delay. However, when requested information is found outside of the ISP LAN, the Wide Area Network (WAN) is used to connect the ISP or BISP to the host electronic location. Typically bandwidth throughput of the devices in the WAN is less than those of the ISP LAN. Additionally, the cost of use of the WAN is often far higher than that of the LAN.

The Internet was initially perceived and designed to carry text-based e-mail and Hyper Text Transfer Protocol (HTTP) encoded documents. Performance of the Internet using HTTP and text based e-mail is not critically time dependent, thus intrinsic latency of the Internet infrastructure is ergonomically acceptable and utilization of bandwidth is minimal. However, data size and demand has increased through the introduction of concepts such as multimedia content data, which intrinsically contains significantly larger data size. This results in performance problems for real time applications where network timing and sustained data rates are critical. Such applications include streaming media and packet switched telephone networks.

Figure 1:
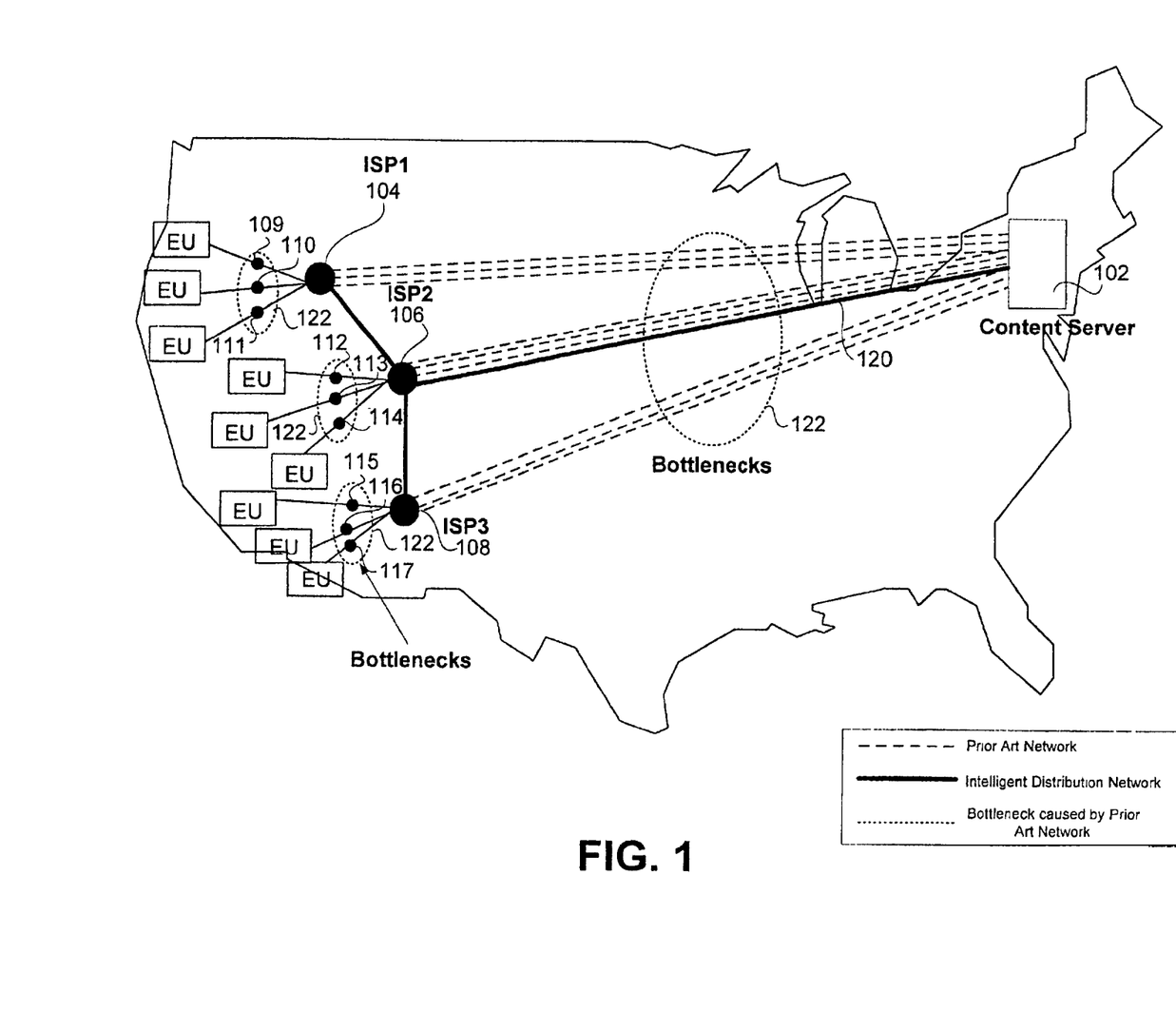
FIG. 1 is a diagram of data transmission paths.

FIG. 1 illustrates the transmission of a data stream from a content server 102 to ISP1 104, ISP2 106 and ISP3 108 and eventually to various end users, via ISP Points Of Presence (POPS) 109, 110, 111, 112, 113, 114, 115, 116, 117. As shown, conventional methods of distribution require a separate transmission for each request from each end user through their respective ISPs 104, 106 and 108. Because the ISP LANs do not contain the requested data, the data must be distributed from the content server 102 through the WAN. However, this method of data transmission presents several problems to both the end users and the ISPs. First, the distribution of streamed data is seriously restricted due to general lack of bandwidth capacity caused by redundant and duplicated transmission to multiple viewers. As shown in FIG. 1, bottlenecks 122 may occur during the transmission from the content server 102 to the ISPs 104, 106 and 108 and during the transmission from the ISPs 104, 106 and 108 to the end users. The bottlenecks 122 reduce viewing quality and access speeds, and increases viewing costs as ISPs pass on bandwidth access or rental costs to the end users. Further, when data packets are lost the end user request for retransmission of that data must be sent back to the content server 102, this retransmission introduces redundant bandwidth utilization effecting all users connected to the server. The addition of bandwidth to overcome this problem is currently very costly to ISPs. Furthermore, because bandwidth constraints are defined by the lowest capacity hop between the content source and the end user, capacity additions to one Internet segment does not necessarily improve overall capacity.

A second problem with the existing transmission scheme is that the Internet does not provide for the most time or cost effective routing of content to end users. In other words, the data travels through more devices (and thus more hops) than would otherwise be optimal. This not only leads to a reduction in viewing quality and access speed, but also reduces the ability of content providers to track and manage the distribution of proprietary content.

The most common method that ISPs employ to manage the dual problems of bandwidth constraint and inefficient routing is to locate dedicated streaming media servers (SMS) within the ISP LAN, to locally store and redistribute content to ISP customers. However, there are a number of problems with this approach. Typically, an ISP can manage the aggregated bandwidth requirement of a plurality of clients streaming a plurality of data packets within the LAN if the data is from a server located within the ISP LAN. Costs to maintain and manage such servers are expensive. Additionally, content providers are often reluctant to provide content to autonomous operators when copyright protection and royalty/licensing fees are at issue. A further disadvantage of having an autonomous local server is that the storage capacity of the server often limits the choice of content available to the ISP clients. Clients often must access stream media through the WAN.

Therefore, there is a need for a more efficient system and method for the distribution content. Furthermore, there is a need for a universal Streaming Media distribution system.

SUMMARY

The present system and method overcomes or substantially alleviates prior problems associated with data transmissions over the Internet. In general, the present system and method provides an intelligent distribution network (IDN) which optimizes delivery of content to large and diversely located client locations by minimizing the impact of network irregularities, minimizing bandwidth usage inherent in data delivery from a single content source to multiple simultaneous viewers, minimizes packet loss resulting in a decrease latency of data stream delivery, maximizes sustained data rates to clients, and provides a back channel of end-user viewing profiles to content providers via the log collection from nodes The system includes two main components, at least one IDN node and at least one IDN center. When a client requests data from anywhere on the Internet, the client is directed to a preselected IDN center which in turn refers the client to its best performance IDN node. The IDN node then delivers the data to the client over the best performance network link, which may include a plurality of asynchronous transmission devices. The best performance nodes and links are determined by a mapping engine through the use of trace route results between the preselected IDN center, the IDN nodes, the various transmission devices, and the client.

A preferred embodiment of the system and method only requires a SMS to serve one stream to an IDN node, which in turn temporarily buffers the stream in its cache and may relay the content through further nodes and transmission devices to the client. The IDN system may also invoke load sharing between IDN nodes when demand is high therefore maximizing streaming resources of the aggregated IDN nodes within an ISP.

In a further embodiment, nodes may be grouped into zones with each zone having at least one zone master. These zone masters alleviate some of the system management responsibilities of the IDN center, such as the mapping control functions and log retrieval tasks, and thus increase the efficiency of the IDN system.

DETAILED DESCRIPTION OF THE PREFERRED EMBODIMENTS

The present system and method comprises an intelligent distribution network (IDN) for the efficient distribution of content. The IDN system further includes at least one IDN management center and at least one node. The IDN system insures the efficient delivery of media content by limiting the number of content streams to a minimum and using the best performing nodes and links to stream the content. This system results in conservation of bandwidth and a reduction in latency, data packet loss, and unacceptable packet delay.

FIG. 1 illustrates a preferred content stream 120 over an IDN system as compared to a conventional method. According to the IDN system, only one content stream 120 is sent from the content server 102 across the WAN to a downstream node located in ISP2 106. The downstream node in ISP2 106 may be both a delivery node (the last node to receive the content before streaming to end users) and a transient node (node located between the content provider and the delivery node which "passes" the content along) to nodes in ISP1 104 and ISP3 108. Each ISP may locally redistribute the stream data for service within its own LAN. Each node is also capable of buffering and duplicating copies of the same stream thus allowing second and subsequent users to "piggyback" off the original content stream with the duplicated copies. Furthermore, each ISP contains multiple nodes therefore forming multiple points that allow second and subsequent users to "piggyback" off the original content stream thus further reducing the potential for bottlenecks.

Figure 2:
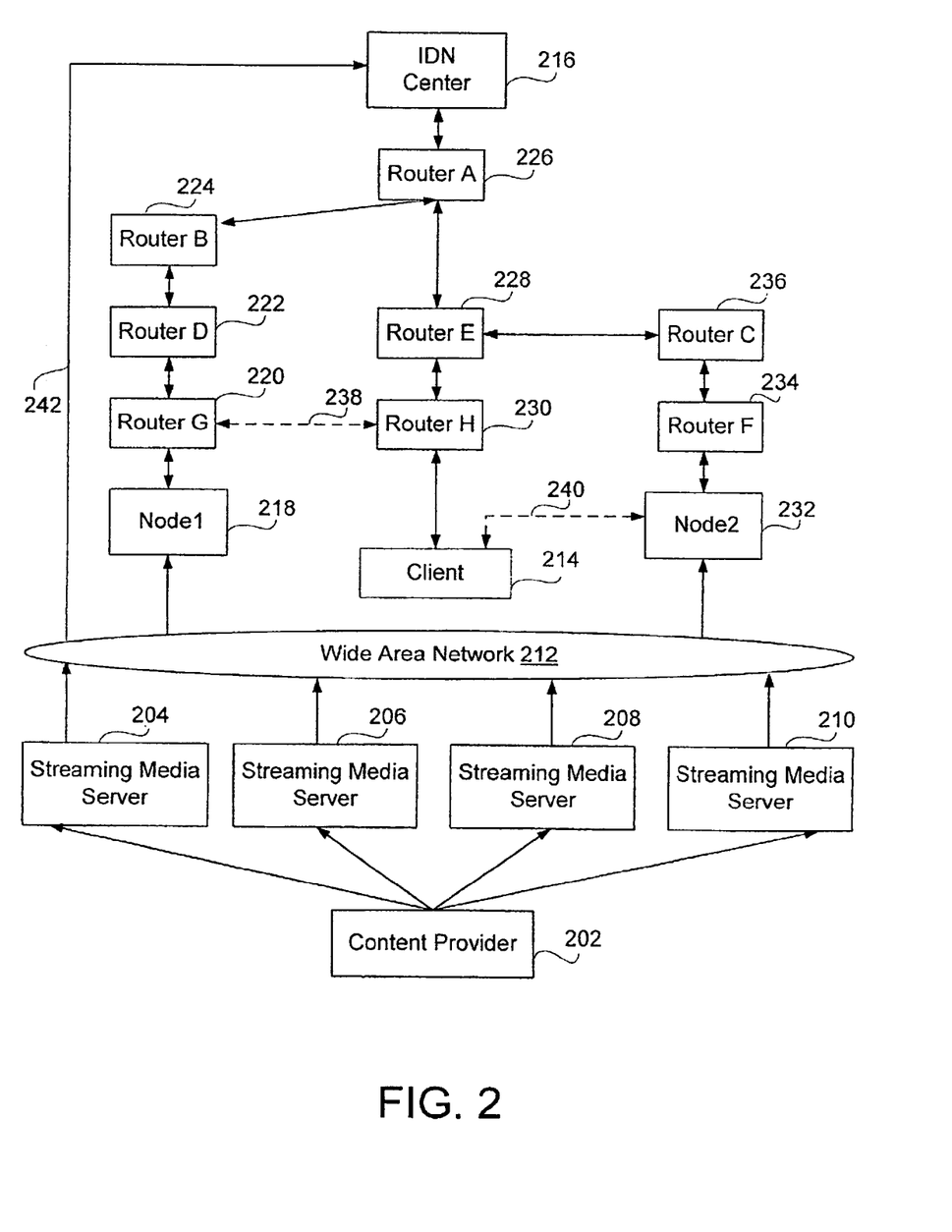
FIG. 2 is a diagram of exemplary transmission paths, according to the present system and method.

FIG. 2 is an illustration of exemplary transmission path architecture between a content provider 202 and a client 214. Client 214 typically selects content from a provider by utilizing a URL on a website. Accordingly, content provider 202, whose content is sourced from streaming media servers (SMS) 204, 206, 208 and 210, forward the content through a Wide Area Network (WAN) 212. In the preferred embodiment this content is delivered over the WAN 212 or by direct connection to an Intelligent Distribution Network (IDN) center 216, which subsequently forwards the content through various transmission devices and nodes to client 214. Alternatively, the content may be sent directly through various nodes in the IDN system (comprising various transmission devices) to client 214. These nodes, which preferably consist of a computing device running SMS and IDN system software, are placed at divergent data locations on the Internet. Such locations include but are not limited to "bottleneck" routing points.

According to the present system and method, IDN center 216 manages the system such that the most efficient route between content provider 202 and client 214 will be utilized. As shown in FIG. 2, numerous routes are available. The preferred embodiment directs the content to client 214 through the IDN center 216 via path 242 through various routers and nodes. Content may also be transmitted to client 214 through node1 218 and routers G 220 D 222, B 224, A 226, E 228 and H 230. Alternatively, another route may send content via node2 232 and routers F234, C236, E228 and H230.

Figure 3:
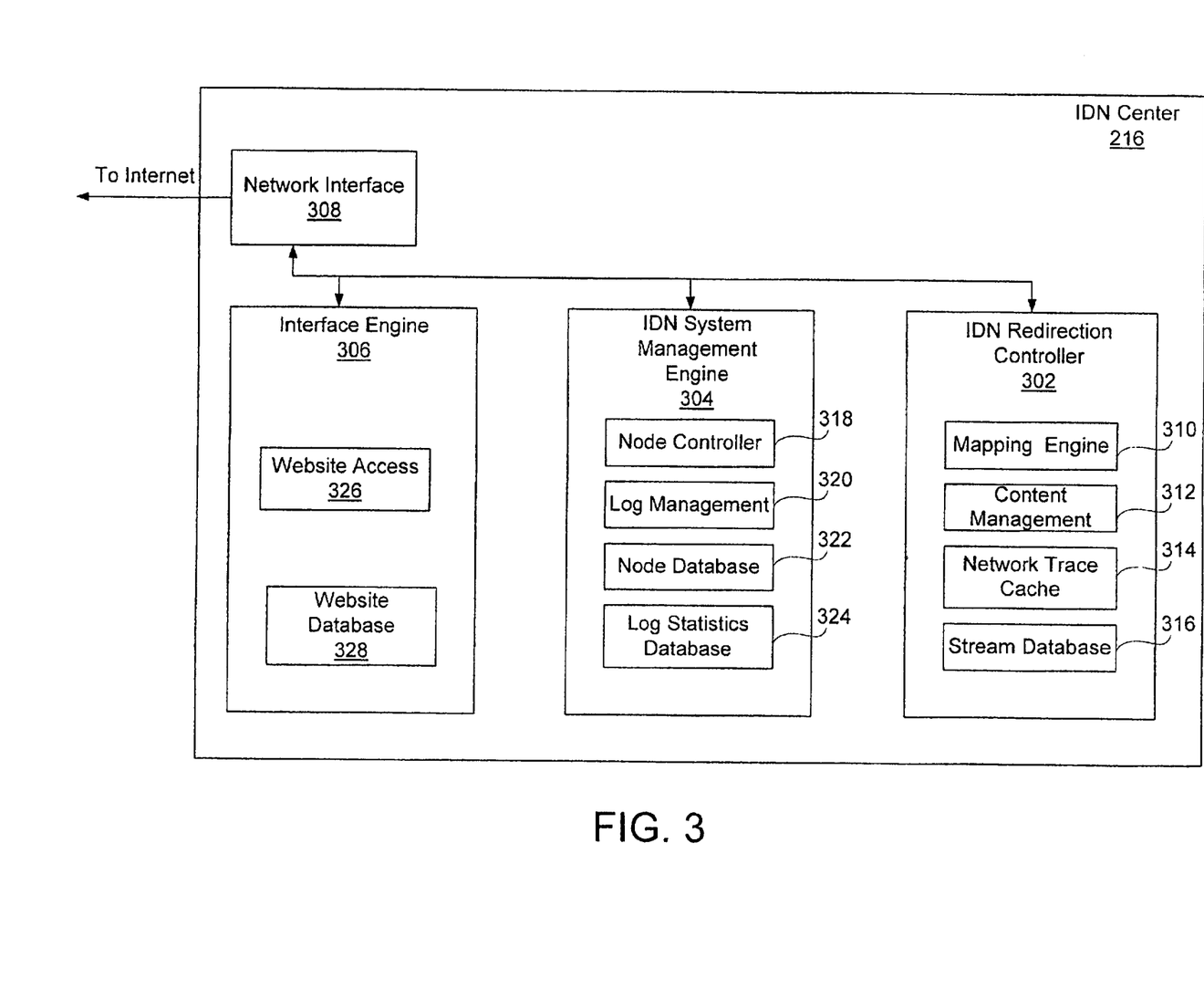
FIG. 3 is a block diagram of an IDN center of FIG. 2.

FIG. 3 is a block diagram of exemplary components of IDN center 216. The IDN center 216 includes an IDN redirection control 302, an IDN system management engine 304 and a web interface engine 306 along with a network interface 308 for communication with the Internet.

IDN redirection control 302 handles requests for content from clients originating from anywhere on the Internet. The IDN redirection control 302 further comprises a mapping engine 310 for mapping points in Internet space and a content management controller 312 for registration of content. Mapping engine 310 performs client location identification, node-client relationship analysis and node-node relay delegations. The results of all these traces are then stored in network trace cache 314 for future use. Basic content provider details would typically be registered with the content management controller 312. For example, this data may include channel number location, URL details and billing summary data. Registration may be executed though various methods including a standard web interface or programmatically by authorized third parties, which is then stored in a stream database 316.

IDN system management engine 304 includes a node controller 318 and a log management controller 320. Node controller 318 receives periodic and event based status information from various nodes such as SMS logs and other network management device logs about network performance and 'billing per bit' usage, and provides updated network information either direct or via propagation to all nodes as required, thus giving enough information to each node about its surrounding environment to overcome most transient problems. Other subsystems of IDN center 216 may also use the information obtained by node controller 318. For example, IDN redirection controller 302 may use this information to override stored node-client maps. A node database 322 stores all the information pertaining to each node. This information may include a node Globally Unique Identifier, IP address (or group of IP addresses), a node's client capacity, client distribution policies including content stream capacity, and scope of client IP classes included/excluded from a particular node.

Log management controller 320 compiles and processes log statistics received from the nodes. The compilation of these logs may produce content provider reports, gauge client experiences, and provide feedback on the node-client matching to correct for inconsistencies including routing errors, corrections for time of day, corrections for heavily utilized links, or any such combinations thereof. These logs and compilations are stored in a log-statistics database 324. From the log statistics database viewer profiles and billing information may be extracted by matching client globally unique identifiers with logging information. These viewer profiles and billing information may be used for collating information on what a single viewer watches, the regularity at which they view content and their purchasing patterns, or what a content providers utilization on the IDN in terms of viewer audience is, and therefore charged.

The interface engine 306 allows network and content provider managers access to the IDN databases, where appropriate, through website database interface 328. Although preferably a web site interface is used, an equivalent interface as is well known in the art may be used to access databases. Because this information may be confidential or proprietary, access to the IDN databases is preferable approved by website access controller 326, which provides security measures. These security measures may include requiring login and password verification or other forms of user identification and control. The managers may then download/upload data and access specific configuration information and statistical analysis with respect to content streams delivered by the system. This information includes a content distribution policy, a content charging policy, a viewer content profile or any other specific policy.

A preferred example of policies as applicable to the IDN System may include but not be limited to; what a customer is charged to watch content, including 'pay per bit' or 'pay per content' as known in the art, the number of clients a node can serve, the number of clients a node can serve for a particular content, the maximum number of clients who can watch the content, the blocking of clients who are banned from content as they have not paid for access or are contained on a black ban list, whether particular content is allowed out of a zone area, and time of day in which content is allowed to be viewed.

The following is a description of the IDN system location and redirection technology. Referring back to FIG. 2, when an initial request for a particular content is made, the IDN center 216 will first look up the client's IP class to determine if previous existing information exists in network trace cache 314 (FIG. 3) concerning which node, of the nodes currently relaying or enabled to relay the requested content, is best situated to serve client 214. If the information does not exist or is outdated, the IDN center 216 will initiate a trace route to client 214 with mapping engine 310 (FIG. 3). The following table shows an exemplary trace route between IDN center 216 and client 214. It should be noted that latency is calculated as the response time between IDN centers 216 and each router or client 214.

TABLE A

IDN-Client Trace Table

| Hop | Latency | Location | IP Address |
|---|---|---|---|
| 1 | 10 ms | IDN Center | [192.168.1.200] |
| 2 | 118 ms | Router A | [203.168.37.29] |
| 3 | 207 ms | Router E | [203.156.34.25] |
| 4 | 217 ms | Router H | [203.43.36.127] |
| 5 | 189 ms | Client | [210.45.67.78] |

The result of the IDN-client trace route is then compared to known trace routes contained in a lookup table in network trace cache 314 (FIG. 3) for nodes with the content currently available. Hops of a node trace route result are then matched against the trace route results from IDN center 216 to client 214. The following table shows an exemplary trace route result for the path between IDN Center 216 and node1 218.

TABLE B

IDN-Node1 Trace Table

| Hop | Latency | Location | IP Address |
|---|---|---|---|
| 1 | 10 ms | IDN Center | [192.168.1.200] |
| 2 | 118 ms | Router A | [203.168.37.29] |
| 3 | 207 ms | Router B | [203.156.134.25] |
| 4 | 217 ms | Router D | [200.45.36.127] |
| 5 | 189 ms | Router G | [210.45.67.178] |
| 6 | 169 ms | Node1 | [186.47.167.178] |

And the table for an exemplary trace route result from IDN Center 216 to node2 232 is as follows.

TABLE C

IDN-Node2 Trace Table

| Hop | Latency | Location | IP Address |
|---|---|---|---|
| 1 | 10 ms | IDN Center | [192.168.1.200] |
| 2 | 118 ms | Router A | [203.168.37.29] |
| 3 | 207 ms | Router E | [203.156.34.25] |
| 4 | 207 ms | Router C | [193.76.34.25] |
| 5 | 217 ms | Router F | [206.45.36.12] |
| 6 | 189 ms | Node2 | [134.145.67.178] |

The comparison process will provide a hierarchical estimate of a plurality of most likely 'electronically best performing' network links from own nodes to client 214. While FIG. 2 only illustrates two nodes, in practice, the number of nodes may be quite high, thus the need to determine the 'electronically best performing' links is crucial. IDN center 216 then passes information regarding the best performing links to a detailed interrogation routine in node controller 318 (FIG. 3) that may for further accuracy command the likely best performing nodes to trace the route between themselves and client 214. If the trace is not needed, then the IDN center uses the 'best performing' link as determined by the IDN-node mappings. An exemplary result of a trace between node1 218 and client 214 is shown below.

TABLE D

Node1-Client Trace Route

| Hop | Latency | Location | IP Address |
|---|---|---|---|
| 1 | 10 ms | Node1 | [186.47.167.178] |
| 2 | 56 ms | Router G | [210.45.67.178] |
| 3 | 207 ms | Router D | [200.45.36.127] |
| 4 | 217 ms | Router B | [203.156.134.25] |
| 5 | 189 ms | Router A | [203.168.37.29] |
| 6 | 207 ms | Router E | [203.156.34.25] |
| 7 | 217 ms | Router H | [203.45.36.127] |
| 8 | 315 ms | Client | [210.45.67.78] |

Similarly, an exemplary trace route result from node2 232 to client 214 is own below.

TABLE E

Node2-Client Trace Route

| Hop | Latency | Location | IP Address |
|---|---|---|---|
| 1 | 10 ms | Node2 | [134.145.67.178] |
| 2 | 57 ms | Router F | [206.45.36.12] |
| 3 | 207 ms | Router C | [193.76.34.25] |
| 4 | 217 ms | Router E | [203.156.34.25] |
| 5 | 217 ms | Router H | [203.45.36.127] |
| 6 | 189 ms | Client | [210.45.67.78] |

Latency in the above two tables is calculated as the round trip response time from the node to a particular router or client. It is possible that a downstream device may report a lower latency then an upstream device when a downstream device uses a peer link to send a response on a different path back to nodes 218 or 232, the downstream device is heavily loaded with computational tasks, or it has an intrinsically slow response to a trace route request. Because the mapping process works from nodes as well as IDN center 216, peer links and asymmetries of the Internet are discovered and utilized by various algorithms in mapping engine 310 (FIG. 3). Therefore, it is not unusual to find later trace route hops with shorter times than intermediate hops as they use better paths through better routing tables, or are just faster to respond or less busy. From the results of these two trace routes, node2 232 is tentatively best suited to relay content to client 214 with a network response time of 189 ms. Thus, node2 232 is allocated to client 214 as the streaming source and will serve the content stream.

FIG. 2 also shows a peer link 238 connecting router G 220 and router H 230. This peer link 238 may be provided for exclusive data sharing between router G 220 and router H 230. An exemplary trace route result from node1 218 to client 214 through the peer link 238 is shown below.

TABLE F

Node 1/Client Trace Route With Peer Link

| Hop | Latency | Location | IP Address |
|---|---|---|---|
| 1 | 10 ms | Node1 | [186.47.167.178] |
| 2 | 56 ms | Router G | [210.45.67.178] |
| 3 | 75 ms | Router H | [203.45.36.127] |
| 4 | 77 ms | Client | [210.45.67.78] |

In this situation, node1 218 would be best able to serve the content stream to client 214 through peer link 238 since the network latency is only 77 ms.

Preferably, client 214 connects directly to node2 232 via a client connection 240. In this instance, an exemplary trace route result yields the following table.

TABLE G

Node2/Client Trace Route with Client Connection

| Hop | Latency | Location | IP Address |
|---|---|---|---|
| 1 | 10 ms | Node2 | [134.145.67.178] |
| 2 | 22 ms | Client | [210.45.67.78] |

Because the network path between node2 232 and client 214 involves only one direct electronic path, latency is low, 22 ms. Additionally, because the node is within one network hop to client 214, packet loss and unacceptable delay are significantly reduced, thus resulting in the most efficient network electronic path.

These mapping calculations between the various nodes and client 214 may be performed simultaneously and typically take less than 500 ms. Thus, the cumulative time between the initial trace route from IDN center 216 to client 214 and the consecutive class mapping trace routes from the selected nodes to client 214 can be completed, typically, in a few seconds. Additionally, if current mapping information already exists in network trace cache 314 (FIG. 3), then the entire process may be completed even faster.

In a further embodiment, the information gathered through this process may be sent to a neural net system or similar as known in the art for future learning or modification of mappings to more effectively run the IDN system. Furthermore, IDN managers may manually assign node-client mappings for reasons intrinsic to their own operation such as time of day or other variances.

Once a client is assigned a 'best' or 'nearest' node, the IDN network trace cache 314 is updated with that client's class-node mapping. This result may then be used for any other clients originating from the same class IP address range without going through the class mapping procedure again. Therefore, when a popular site is receiving a plurality of 'hits' from clients within the same class IP address range, a large number of these clients can be directed to their electronically nearest or best node from stored client class-node mapping results contained in network trace cache 314 obtained from an earlier client request (initial request) for the content.

Furthermore, when client 214 is already receiving a stream from a node, any further clients requesting the same content may "piggyback" off the node. This would require the subsequent clients to connect, either directly or indirectly through other nodes or transmission devices, to any node that is currently serving the content to client 214. Once connected, the subsequent clients can obtain data from the same initial content stream. Thus, only one distribution of the content is required to serve multiple clients.

Nodes may be grouped into zones based on geographical or market demographic locations. Alternatively, zones may be based on other categories. Zones contribute to the efficiency of the IDN system by segregating content into two sets: global and thus circumnavigating the world (e.g. CNN) and regional (e.g. San Francisco Little League). Because regional content has a much smaller audience, the content is 'contained' within the local regional zone or zones. Thus, the management overhead of the IDN center and the global system is not consumed.

Figure 4:
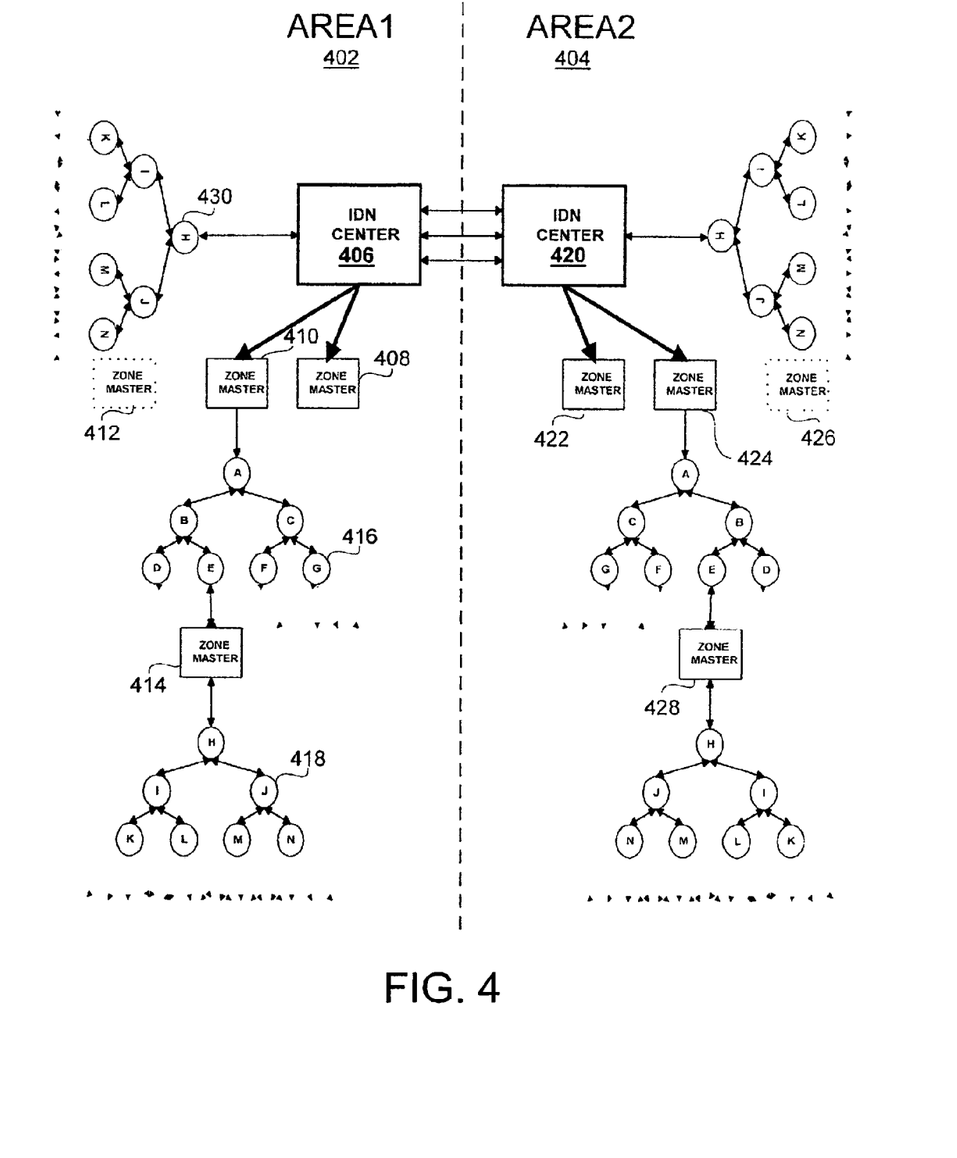
FIG. 4 is a diagram of exemplary zones within an area, according to the present system and method.

FIG. 4 shows an exemplary IDN network topography incorporating a zoning system based on autonomous system (AS) maps. Autonomous systems are defined through the Boarder Gateway Protocol (BGP) as known in the art. Typically, an autonomous system is a set of class of IP address that may belong, for example, to one particular ISP. The network includes two areas, Area1 402 and Area2 404 located in a geographically different location from Area1 402. Area1 402 contains its own IDN center 406 that controls zone masters 408, 410, 412 and 414. As shown in FIG. 4, a second tier zone master (zone master 414) may be included within a first tier zone (such as zone master 406). These zone masters in turn control a plurality of downstream nodes. For example, zone master 406 controls nodeG 416 and nodeJ 418. Similarly, Area2 404 contains an IDN center 420 that controls first tier zone masters 422, 424 and 426 and second tier zone master 428.

In the preferred embodiment, IDN centers 406 and 420 share information at a top level including location compiled lookup tables and other gathered network intelligence. IDN centers 406 and 420 in turn communicate with their first tier zone masters 408, 410, 412, 422, 424 and 426 and directly connected nodes such as node H 430. The communications are subsequently streamed "down the line" to the downstream nodes. It should be noted that the last tiers of the downstream nodes may be connected to further nodes, transmission devices or to clients (not shown). Additionally, alternative node and zone master configurations may be utilized within each area.

In regards to Area1 402, zone masters 408, 410, 412, and 414 are central node locations that may be assigned additional functionality in order to relieve IDN center 406 of individual attention to some downstream nodes. Thus, zone masters 408, 410, 412 and 414 form a buffer zone between the downstream nodes and IDN center 406. The functions of these zone masters will be discussed in more detail in connection with FIG. 5.

Zones master 412 and 426 represent a plurality of additional zone masters. Because content may enter the IDN system from any node within the system, a user from one zone area may seek content that is effectively sub managed in another zone. In this situation, zone master 412 must communicate with zone master 410 that control the requested content. Accordingly, cached quasi-static information and mappings that are high in demand may be forwarded into zones, which in turn handle much of the network traffic for the content.

Assignment of nodes to zone masters will be based on a node's location and the number of nodes in the downstream chain. If the number of nodes downstream is high, a zone master will be likely assigned to assist the IDN center 406.

Figure 5:
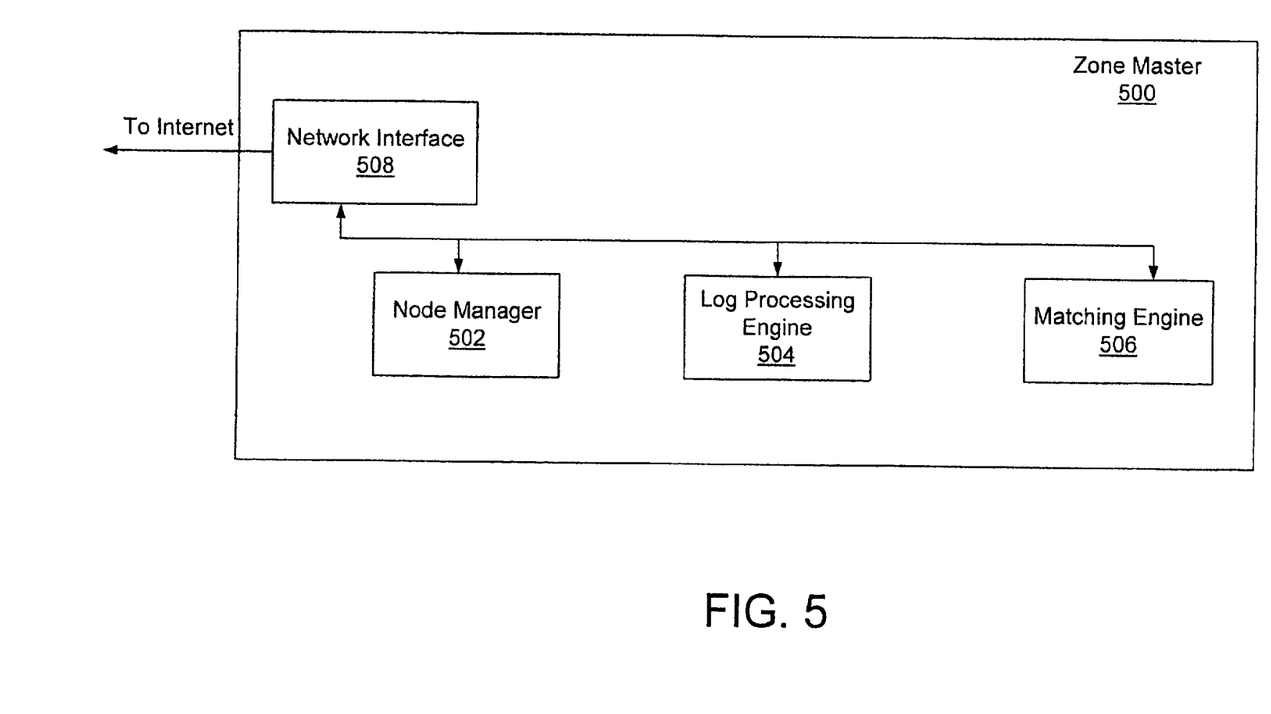
FIG. 5 is a block diagram of exemplary components of a zone master.

FIG. 5 shows exemplary components of a zone master 500 that include a node manager 502, a log processing engine 504 and a matching engine 506. Zone master 500 communicates through the Internet via network interface 508. Node manager 502 is responsible for managing downstream nodes within the zone. Management includes receiving periodic and event based status information from the nodes, reporting status and network configuration changes within the zone to IDN center, and providing updated network information to the nodes. Log processing engine 504 will pre-process node logs prior to forwarding the information to the IDN center. By pre-processing the information, resources and available bandwidth is utilized more efficiently. Finally, matching engine 506 performs node-client matching of downstream node locations. This matching engine 506 processes a similar functionality to the mapping engine 310 (FIG. 3) in the IDN center 216 (FIG. 2). A client first requests content from an IDN center which in turn forwards the request to zone master 500 where matching engine 506 is assigned the mapping responsibility to allocate a node-client assignment. The decision to forward a client request to a zone master is made by the servicing IDN center after an address class match is found to be associated with a zone master. In this situation the client is simply redirected to the zone master without any further processing at the IDN center.

The following is a description of how Location Compiled Tables (LCT) is used by the IDN system. In the preferred embodiment the IDN system uses mapping engine 310 (FIG. 3) or matching engine 506 (FIG. 5) to trace routes to each of the nodes in its management area. The result of one exemplary trace route is shown below.

TABLE H

| | Trace Route Results to Node Located within a Zone | | | | | | | | | | | |
|---|---|---|---|---|---|---|---|---|---|---|---|---|
| IP Address | Hop 1 | Hop 2 | Hop 3 | Hop 4 | Hop 5 | Hop 6 | Hop 7 | Hop 8 | Hop 9 | ... | Hop 31 | Hop 32 |
| aaa.bbb.ccc.ddd | A | B | C | D | G | N | AG | KW | ZG | | KHLQ | TSUH |

The IP address of the node is "aaa.bbb.ccc.ddd", and the trace results show 32 hops each with an intermediate IP address (represented by capital letters) on the path to reach the node. Thus with the first router (Hop 1), IDN mapping engine 310 (FIG. 3) or matching engine 506 (FIG. 5) determines its location to be a unique IP address represented by "A". At this point the IDN system is not interested in latency. Instead, the IDN system is only mapping paths defined by the intermediate router IP addressed to each node.

The trace results to all nodes in the zone are then placed in a LCT by ascending hop unique results. An exemplary LCT has the following format wherein the IP address in each cell of the table is represented, for simplicity of this example, by unique letters.

TABLE I

Location Compiled Table (LCT)

| Hop 1 | Hop 2 | Hop 3 | Hop 4 | Hop 5 | Hop 6 | Hop 7 | Hop 8 | Hop 9 | ... | Hop 31 | Hop 32 |
|---|---|---|---|---|---|---|---|---|---|---|---|
| A | B | C | D | F | L | AC | KS | ZC | ... | KHL | TSUD |
|   |   |   | E | G | M | AD | KT | ZD | ... | KHLN | TSUE |
|   |   |   |   | H | N | AE | KU | ZE | ... | KHLO | TSUF |
|   |   |   |   | I | O | AF | KV | ZF | ... | KHLP | TSUG |
|   |   |   |   | J | P | AG | K  | ZG | ... | KHLQ | TSUH |
|   |   |   |   | K | Q | AH | KX | ZH | ... | KHLR | TSUI |
|   |   |   |   |   | R | AI | KY | ZI | ... | KHLS | TSUJ |
|   |   |   |   |   | S | AJ | KZ | ZJ | ... | KHLT | TSUK |
|   |   |   |   |   | T | AK | LA | ZK | ... | KHLU | TSUL |
|   |   |   |   |   | U | AL | LB | ZL | ... | KHLV | TSU |
|   |   |   |   |   | V | AM | LC | ZM | ... | KHL | TSUN |
|   |   |   |   |   | W | AN | LD | ZN | ... | KHLX | TSUO |
|   |   |   |   |   | X | AO | LE | ZO | ... | KHLY | TSUP |
|   |   |   |   |   | Y | AP | LF | ZP | ... | KHLZ | TSUQ |
|   |   |   |   |   | Z | AQ | LG | ZQ | ... | KHM | TSUR |
|   |   |   |   |   | AA | AR | LH | ZR | ... | KHM | TSUS |
|   |   |   |   |   | AB | AS | LI | ZS | ... | KHM | TSUT |
|   |   |   |   |   | ... | ... | ... | ... | ... | ... | ... |

Typically, mapping engine 310 or matching engine 506 is located on a server or workstation within a hosting facility. Therefore, data from mapping engine 310 or matching engine 506 will likely travel through several routers before reaching the Internet backbone. Thus in the exemplary LCT above, all the trace results have the same first three hops indicating that the data always has to go through the same three routers (or other transmission devices) to reach the Internet backbone. It is at hop 4 where there is a divergence—more than one router available. By hop 6, 17 unique routers are responding to mapping engine 310 or matching engine 506. As we increase hops, the LCT maps every single router in the participating ISPs. For efficiency, the compilation of the LCT may occur offline and be updated at intervals of time, thus conserving bandwidth at the IDN Center and zone master while keeping the LCT current. Within a management area, there may be a thousand ISPs each with 10 points of presence (ideal place for an end user node) each hosting a node of the IDN system. Thus, the trace performed by the mapping engine 310 or the matching engine 506 may give 10,000 results for one management area.

The LCT is used to compile a Best Performing Node Index (BPNI). For each cell entry in the BPNI there consists of a small data set of the prioritized 'nearest', 'cheapest' or other weighting criteria, set of nodes that are relevant to that particular electrographic location. In the preferred embodiment these set of nodes are called the 'best performing' nodes. Every unique router address contained in the LCT has an entry in the BPNI.

The BPNI is created by first compiling a complete table of node network IP addresses in the forward direction for each cell. A node network IP address is defined as the IP address of the router that lies in the same network as the node. The node network addresses are then sorted based on a node sort algorithm (NSA). The IDN center 216 or zone master 500 may weight various factors when creating this raw table such as network bandwidth, historical performance, transmission time, transmission reliability and other factors constituting 'quality of service' attributes when processing the NSA.

Figure 6:
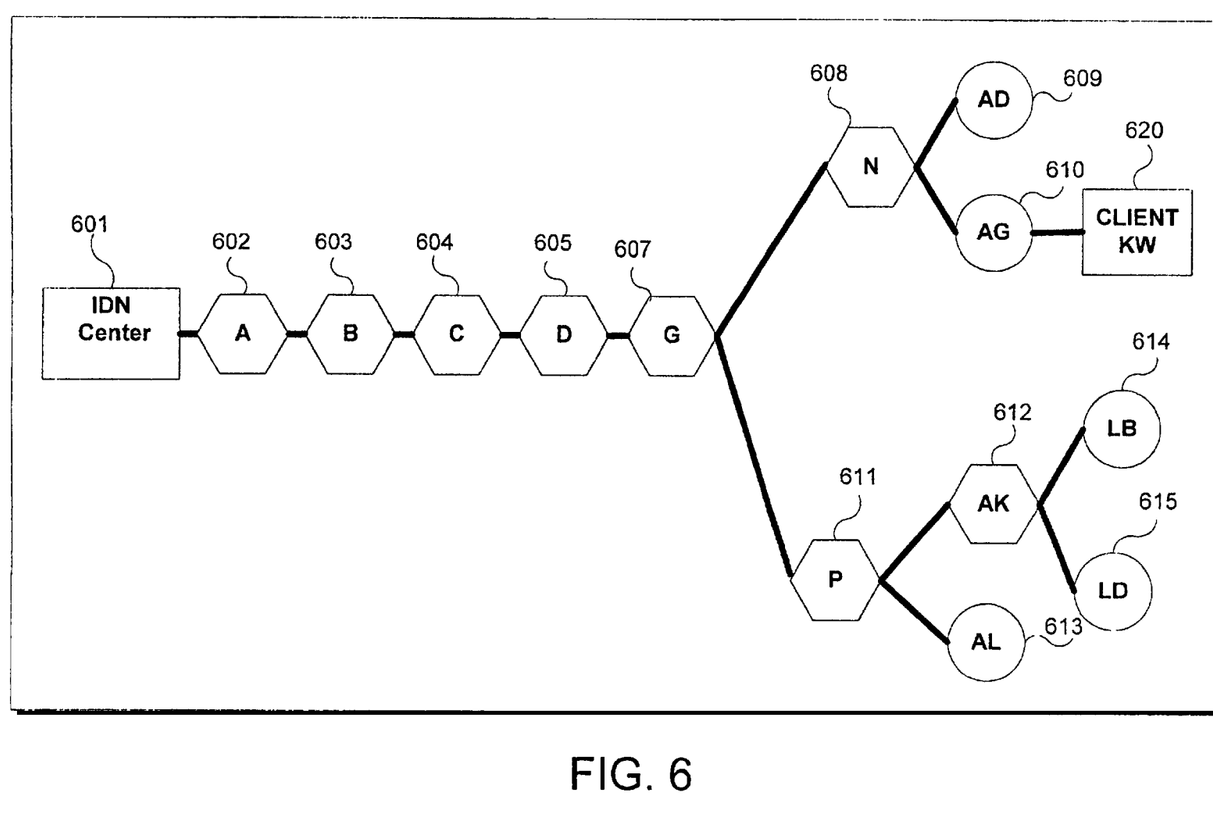
FIG. 6 is a flow diagram of an exemplary IDN node and router topology including an IDN Center and a client.

FIG. 6 indicates an exemplary routing topology to five nodes AD 609, AG 610, AL 613, LB 614 and LD 615, and nine routers A 602, B 603, C 604, D 605, G 607, N 608, P 611, and AK 612 in relation to an IDN center 601 and a client 620 (as per the exemplary LCT—Table I). In the preferred embodiment best performing node order is determined by traversing the topology tree of the LCT in a forward direction from a first unique router address. Nodes are given a weight based on hop count from this first unique router address. When all forward looking nodes have been registered the process is repeated for the unique router address at the location one hop closer to the IDN center 601 relative to the first unique router address. Further nodes discovered not previously registered have their weightings increased by a delta amount to reflect that if these nodes are used then data will first have to be delivered from this node back to the IDN center 601 to the divergent router location and then from the IDN center 601 forward to the client 620.

Discovered nodes are then inserted into an ordered list (order based on weight) and truncated at a predetermined number. The predetermined number of the top priority nodes are then saved in the BPNI. This predetermined number is a best performing node count (BPNC). In a preferred embodiment, the BPNC is set to five, although other values may be used. If the NSA provides a list of nodes that is greater than the BPNC, then only the top results (truncated at the NSA variable length) are stored in the BPNI.

Shown below is an exemplary table of z-dimension data (BPNI) for three sample cells.

TABLE J

Three Sample Cells Taken from the Best Performing Node Index

| Preferred | Hop5/G | Hop6/N | Hop7/AG |
|---|---|---|---|
| 1 | AD | AD | AG |
| 2 | AG | AG | AD |
| 3 | AL | AL | AL |
| 4 | LB | LB | LB |
| 5 | LD | LD | LD |

For example, hop 7 from an exemplary IND-Client trace route result (Table K) gives a location represented as AG 610. The BPNI of AG is shown above having five prioritized nodes. The IP addresses of these prioritized nodes are represented by AG 610, AD 609, AL 613, LB 614 and LD 615. BPNI is also shown for sample hop 6 location N and hop 5 location G 607.

The following describes how a client is redirected to the 'closest' node. Assuming that a client is connecting for the first time (no cache data is available) the IDN trace engine will actively calculate the route to the client KW 611 and return the route as represented in exemplary IDN Center-Client trace route result, Table K. An IDN Location Algorithm (IDNLA), a component of the mapping engine 310 (FIG. 3) stored in the IDN center or where delegated in the matching engine 506 (FIG. 5) stored in a zone master, takes the IDN center-client trace route result and counts the number of hops is contains. For example, if the client is eight hops from the IDN center at a location KW 611 then the IDNLA will look in the BPNI for a match on the (number of hops to the client—1) trace route result (hop 7) being address AG 610.

TABLE K

Exemplary IDN Center - Client Trace Route Result

| Client | Hop1 | Hop2 | Hop3 | Hop4 | Hop5 | Hop6 | Hop7 | Hop8 |
|---|---|---|---|---|---|---|---|---|
| 1 | A | B | C | D | G | N | AG | KW |

The following is an exemplary BPNI Unique Router Address Table.

TABLE L

Exemplary Best Performing
Node Index Unique Router Address Table

| Index | Node Network Address |
|---|---|
| 1 | L |
| 2 | R |
| 3 | AA |
| 4 | AB |
| 5 | AG |
| 6 | AL |
| 7 | LB |
| 8 | LD |
| 9 | LZ |
| 10 | MI |
| 11 | MN |
| 12 | PO |
| 13 | PQ |
| 14 | PS |
| 16 | PZ |
| 17 | QA |
| 18 | QD |
| ... | ... |

The matching of trace route hop results against the exemplary BPNI Unique Router Address Table (Table L) is preferably performed using an iterative method. A first guess of one half of the total index length of rows in the exemplary BPNI Unique Router Address Table is used. Thus, if the exemplary BPNI Unique Router Address Table has 1038 entries, then the first guess is 519, which gives an exemplary IP address ZPI. Because this index guess IP address is greater than the AG IP address we are trying to match, the previous index guess is halved and either added to the previous guess (if it was too small) or subtracted from the previous guess (if it was too large). In this case, the true result (index 5—Table K) is less than the guessed index of 519. Thus, the guessing algorithm will follow the following computation method:

TABLE M

Guessing Algorithm for
Matching BPNI Unique Router Address Table Cell

| Guess No. | Computation | Index No. |
|---|---|---|
| 1 | ½ × 1038 | 519 |
| 2 | 519 − integer part of (½ × 519) | 259 |
| 3 | 259 − integer part of (½ × 259) | 129 |
| 4 | 129 − integer part of (½ × 129) | 65 |
| 5 | 65 − integer part of (½ × 65) | 33 |
| 6 | 33 − integer part of (½ × 33) | 17 |
| 7 | 17 − integer part of (½ × 17) | 9 |
| 8 | 9 − integer part of (½ × 9) | 5 |

Column Row Index = 1038

Thus, in the exemplary BPNI, a 1038 entry index can resolve in eight computational steps. If no match is found, then the system may either try to find a match using the previous hop (in the example above, hop 6) of the IDN Center-Client trace Route Result and the BPNI Unique Router Address Table thus moving back a hop. If a match is again not found the process described iterates back one hope at a time on the IDN Center-Client Trace Route Result until a match is found.

Once this match is found, the BPNI of the resolved cell provides the five best performing nodes in order of priority. The IDN system can then send the client to the highest priority node, load share to a lower priority node, or instruct all or some of these five nodes to perform a cross trace route from the node to the user and return the results to the IDN center 216 or zone master 500 for further analysis before assigning a best performing node to the client. This entire process only takes a few seconds in the first instance, and even less time if client trace results are stored and the BPNI Unique Router Address Table is current (thus eliminating the need to run a trace route to the client and preferred nodes in the zone).

Class mapping may be used to associate client IP addresses by the mapping engine 310 or matching engine 516 such that the resultant best performing node found for the first client from within a class map is used for all other client from within the same class map until the BPNI expires, or another decision is made to renew the result of the best performing node for that client class map.

Figure 7:
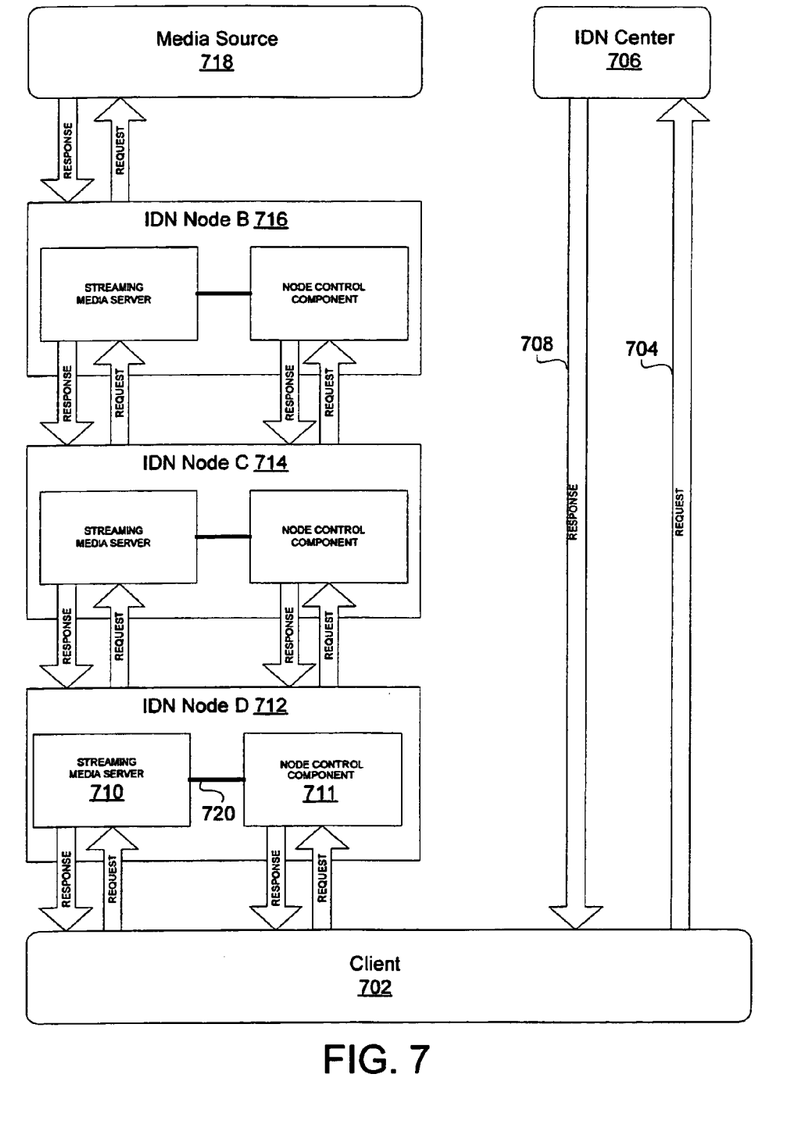
FIG. 7 is a diagram of an exemplary communication process, according to the present system and method.

Once the best performing node is determined for a client, the requested media may be served to the client. FIG. 7 illustrates a preferred communication process between nodes in the IDN system for transmission of live streaming media content. Initially, a client 702 sends a request 704 to IDN center 706, which responds with 708 to client 702 by redirecting it to a media server 710 and node control component 711 in the 'nearest' node, IDN node D 712, as determined by the trace route results previously discussed. The node control component 711 instructs the SMS 710 via the SMS API functions 720. IDN center 706 then controls the communications between nodeD 712, nodeC 714, nodeB 716 and media source 718 to set up the most efficient transient delivery path for the stream of content.

Any further clients who request the same content from IDN center 706 will be redirected to their nearest transient point (i.e. node B716, node C714 or node D712), as determined by the IDN center 706, for immediate access to the single content stream. Alternatively, the IDN can create another stream transient path to nodes closer to the further clients using node B716, node C714 or node D712 as part of the new transient path. Therefore, various nodes within the IDN system may become the virtual content sources for the streamed content, eliminating the need for each client to access the original media source 718. The result is that one stream to client 702 may be simultaneously streamed to a plurality of other clients. This process is known as piggybacking. The piggybacking process is made further efficient by redirecting clients to their best performing delivery node that may already be actively transmitting the media content. This best performing delivery node is typically a node located close to each client, thus minimizing network traffic.

In a preferred embodiment, after client 702 is directed to best performing delivery node D 712 and while the content stream is being configured, client 702 may be shown locally cached multimedia content. Upon sourcing the content stream, notification is sent down the "chain" of transient nodes B 716 and C 714 until delivery node D 712 is reached, at which time the content becomes seamlessly available to client 702.

In an alternative embodiment, the IDN system utilizes a delivery method based on "channels" similar to television broadcasts. Thus, instead of configuring each server with a different stream name for each content broadcast, a set of pre-configured channels will exist. Streaming media content is then allotted a time slot on one of these channels. Thus, multiple simultaneous events may be streamed concurrently on separate channels, or channels may be used to transmit delayed copies of the same content allowing channel selection as a form of dynamic fast forward and rewind. Furthermore, a client may be directed to locally cached content while being connected to the requested content stream. This locally cached content may include advertising or information relevant to local users only.

Occasionally, the IDN system may experience an error or failure mode. There are two main node errors, transient errors and source stream error. Transient errors may occur when the delivery node fails or a node or link between the media source and the delivery node fails. With a transient error, the zone master (or IDN center if there is no zone master), after receiving notice of the problem, will attempt to directly poll the node in question. If a status is returned from the node then the zone master will assume that the error is a client side problem. However, if there is no response, the zone master will poll a downstream node to confirm a node outage, as oppose to a link failure. In either case, the IDN center will be notified via the zone master of the problem and will take appropriate steps, including not directing further clients to the problem node.

In contrast, source stream errors occur either when configuring content for delivery or during the delivery, itself. In either case, all nodes may detect a source failure and activate the appropriate recovery procedures. First, the detecting node(s) will poll its upstream node, which in turn polls the next upstream node until the point of failure is discovered or the zone master (or IDN center) is reached. Nodes may make assumptions in relation to the outage. For example, if other content continues to be delivered, a simple source failure is assumed, and the client may be switched to a locally cached "outage" status video.

Figure 8:
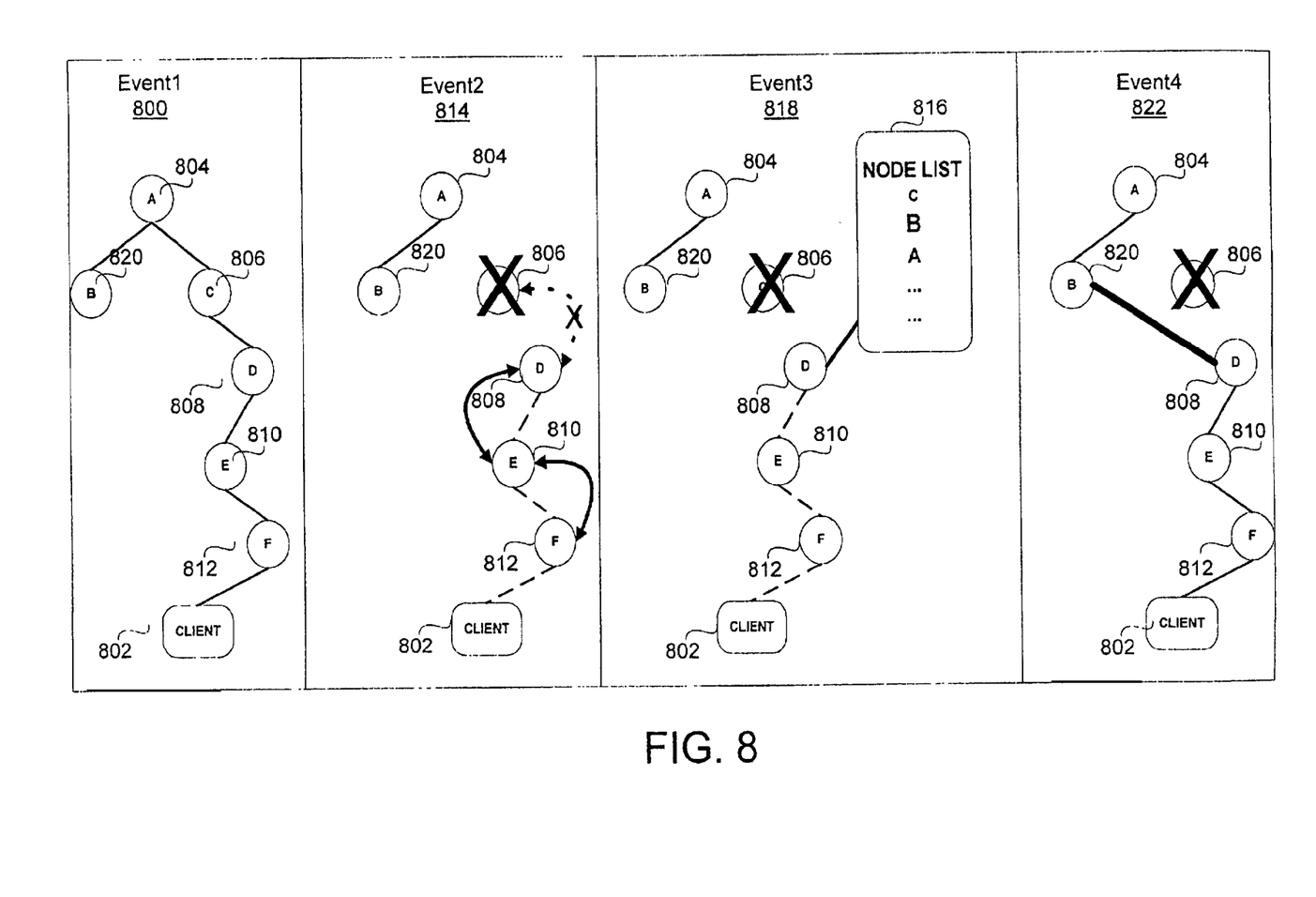
FIG. 8 is a diagram illustrating error recovery according to the present system and method.

FIG. 8 illustrates an exemplary method of recovering from a node failure. As shown in event1 800, client 802 is down streamed media through nodesA, C, D, E, 804, 806, 808, 810 and delivery nodeF 812. In event 2 814, node C 806 experiences a failure. Downstream nodes D, E and F 808, 810 and 812 detect an error when the content is no longer streamed. NodeE 810 and nodeF 812 will poll their respective upstream node and await the results NodeD 808 will detect that nodeC 806 is not responding. Upon receiving a status request from nodeE 810, nodeD 808 will return a "please standby" status.

Because nodeC 806 has completely failed, nodeD 808 must find an alternate upstream source node. NodeD 808 will check an algorithm 816 listing best performing surrounding nodes from data contained in a node configuration file, and attempt to connect based on the algorithm 816 illustrated in event3 818. The algorithm node listing maybe similar to the best performing nodes contained in the BPNI. As shown in algorithm 816, the next nearest node is nodeB 820. Thus, in event4 822, nodeD 808 connects with nodeB 820, and a status message will be delivery to nodeE 810, and subsequently nodeF 812, that the source is once again available. It should be noted that these nodal operations would occur asynchronously resulting in a recovery that is extremely rapid from the point of failure. In fact, it is likely that the client will not even perceive an interruption of service.

It is applicable that a client may request multiple streams from the IDN system. These concurrent streams may be buffered at the client computer device or the delivery node and timing information contained in the stream is used to synchronize the streams such that the streams are viewed and or heard concurrently. This method may also be used to achieve augmentation layers in MPEG coding as known in the art.

In a further embodiment the system as described is used to find the best performing server with respect to network performance for a client, for application such as online gaming and other general Internet technologies. Additionally, BPNI can be compiled for categories of on-demand content. Thus the redirection system described herein can be used for general data location, and the content distributed may be on-demand content.

The node control component 711 may in part, or in full, be incorporated into an operation system such as Microsoft Windows NT and run as a system service. Through remote method invocation or socket interface as known in the art remote computers may be controlled from a central location. Through this interface mapping functions may be performed on behalf of the IDN system and return the results for inclusion into Internet network performance maps. In such an embodiment the IDN system described herein can be used in part or in full as a component of an operating system for general distribution through the universal market as a useful function for all code applications.

In a further embodiment the mapping functions running as a system service, as described previous may be used by a computer operating system to allow computers to interact and form network point to point links under the direction of an IDN center. These links may include routing instructions applied to the data as it is sent from the source PC. Such application may include video conferencing or IP telephony whereby a most efficient data path may be found using IDN nodes between a first computing device to a second computing device. In this application, a first computing device requests an IDN center to assist in establishing a video conference or a packet switched telephone call to a second computing device. Another application is for the first computer device to request an IDN center to form a permanent, or temporary network link between the first computer device and the second computer device such that they may more efficiently share data.

In a further embodiment the IDN system can be used to manage packet switch telephony applications and devices such as WAP, G2, G2.5 and G3 mobile phones. By using the nodes unique path management procedures as described in this patent the voice or video data can be directed to client telephones or a personal digital assistant (PDA) device. Issues that are important to these telephony packet switched infrastructure are minimizing dropped packets, efficiently handling re-request of data packets lost or unacceptably delayed in transmission, and minimizing network path distances between the server and client, which through the IDN system can be virtual served at node locations thus improving throughput. It is typical of these telephone devices and infrastructure that a user can be located to within nine meters geographically. The IDN system can be used to associate this user to the IDN electrographic data and therefore form electrographic maps that contain geographic information or geographic maps that contain electrographic data.

In yet a further embodiment the mapping technology described herein may be used to create a new generation of router devices. These router devices act like routers as known in the art, but host all or part of node functionality that is controlled from at least one IDN center.

The IDN system embodies excellent Quality of service attributes as, when high quality of service (high priority) clients request streaming media, the system can downgrade lower quality of service (low priority) clients who are already receiving streams at a higher quality of service than they need (or have paid for) by switching them to a less optimal and/or cheaper path to make way for the new high priority client.

The invention has been described above with reference to specific embodiments. It will be apparent to those skilled in the art that various modifications may be made and other embodiments can be used without departing from the broader scope of the invention. Therefore, these and other variations upon the specific embodiments are intended to be covered by the present invention, which is limited only by the appended claims.

What is claimed is:

1. A system comprising:
a management center;
a plurality of nodes configured to: relay a continuous stream of data from a content provider to a first client in response to an initial request for the continuous stream of data, replicate the continuous stream of data, and transmit the replicated stream of data to at least one other client;
wherein the management center comprises a mapping engine that is configured to map trace routes between the management center, at least one of the nodes, and at least the first client so as to determine one or more optimal routes from the management center to the first client via the at least one of the nodes, and configured to direct a node relaying the continuous stream of data from the content provider to the first client to replicate the continuous stream of data from the content provider, in response to subsequent requests for the continuous stream of data, while the node is relaying the continuous stream of data from the content provider to the first client, and transmit the replicated stream of data to the at least one other client in response to the subsequent requests for the continuous stream of data; and
wherein the management center is configured to downgrade lower priority clients from a higher quality of service network link to a less optimal network link when a higher priority client requests use of the higher quality of service network link.

2. A method comprising:
receiving an initial request for a continuous stream of data from a first client, the request being received by a management center;
directing the first client to a node that is selected as being best situated to relay the continuous stream of data from a content provider to the first client by using a mapping engine to map trace routes between the management center, the node, and the first client, the first client being directed to the node by the management center;
relaying the continuous stream of data from the content provider to the first client via the selected node;
replicating the continuous stream of data from the content provider at the selected node, in response to subsequent requests for the continuous stream of data, while relaying the continuous stream of data from the content provider to the first client;
transmitting the replicated stream of data from the selected node to at least one other client in response to the subsequent requests for the continuous stream of data; and
downgrading lower priority clients from a higher quality of service network link to a less optimal network link when a higher priority client requests use of the higher quality of service network link.

3. The system of claim 1 further comprising at least one content provider server, the at least one content provider server providing at least one stream of multimedia content to the first client.

4. The system of claim 3 wherein the management center determines a route from the content provider server to the first client via the at least one node.

5. The system of claim 1 wherein the management center further comprises a content manager for managing registration of content provider details.

6. The system of claim 1 wherein the at least one node is configured further to buffer the replicated stream of data.

7. The system of claim 1 wherein the continuous stream of data is distributed via channels.

8. The system of claim 7 wherein the continuous stream of data of a first channel is a time-staggered version of identical content of an another channel to achieve virtual fast-forward and rewind by selecting between channels.

9. The system of claim 1 wherein the data includes at least one of: packet switched telephony data, video conferencing data, live media content, and on-demand content.

10. The method of claim 2 comprising performing trace route mappings between a node of a most efficient network link and the first client to determine an optimal delivery route.

11. The method of claim 2 comprising accessing a database in the management center containing trace route data for the node.

12. The method of claim 2 comprising accessing a location compiled table for node location data within a zone.

13. The method of claim 2 comprising accessing a best performing node index unique router address table.

14. The method of claim 2 wherein the content provider server provides at least one of multimedia content stream to the first client.

15. The method of claim 2 wherein the management center determines a route from the content provider to the first client via the node.

16. The method of claim 2 wherein the data includes at least one of: packet switched telephony data, video conferencing data, live media content, and on-demand content.

17. A method comprising:
receiving an initial request by a management center for a continuous stream of data from a first client;
mapping trace routes between the management center and the first client;
mapping trace routes between the management center and one or more nodes to relay the continuous stream of data from a content provider to the first client;
determining a best route to relay the data to the first client from the content provider based on a comparison between the trace routes between the management center and the first client and the trace routes between the management center and the one or more nodes, the best route including one or more of: at least a portion of a network path from the management center to the first client and at least a portion of a network path from the management center to the one or more nodes;

relaying the continuous stream of data from the content provider through the one or more nodes to the first client according to the best route determined;

replicating the continuous stream of data from the content provider, in response to subsequent requests for the continuous stream of data, while relaying the continuous stream of data from the content provider through the one or more nodes to the first client; and transmitting the replicated stream of data from the one or more nodes to at least one other client in response to the subsequent requests for the continuous stream of data.

\* \* \* \* \*